US012555736B2

(12) United States Patent
Allaedini et al.

(10) Patent No.: US 12,555,736 B2
(45) Date of Patent: Feb. 17, 2026

(54) WAGON WHEEL SHAPED X-RAY WINDOW SUPPORT STRUCTURE

(71) Applicant: Moxtek, Inc., Orem, UT (US)

(72) Inventors: Ghazaleh Allaedini, Orem, UT (US); Michael Zappe, Lehi, UT (US)

(73) Assignee: Moxtek, Inc., Orem, UT (US)

( * ) Notice: Subject to any disclaimer, the term of this patent is extended or adjusted under 35 U.S.C. 154(b) by 188 days.

(21) Appl. No.: 18/619,637

(22) Filed: Mar. 28, 2024

(65) Prior Publication Data

US 2024/0371595 A1 Nov. 7, 2024

Related U.S. Application Data

(60) Provisional application No. 63/463,618, filed on May 3, 2023.

(51) Int. Cl.
*H01J 35/18* (2006.01)

(52) U.S. Cl.
CPC ......... *H01J 35/18* (2013.01); *H01J 2235/183* (2013.01)

(58) Field of Classification Search
None
See application file for complete search history.

(56) References Cited

U.S. PATENT DOCUMENTS 6,536,435 B1 * 3/2003 Fecteau ................ A62B 18/084 128/201.24

* cited by examiner

*Primary Examiner* — Hoon K Song
(74) *Attorney, Agent, or Firm* — Thorpe North & Western, LLP

(57) ABSTRACT

An x-ray window 60 or 70 can include a thin film 61 sealed to a support structure 10. The support structure 10 can include an outer ring 11 encircling an outer ring aperture 15, an inner ring 12 encircling an inner aperture, and multiple spokes 13. The inner ring 12 can be located in the outer ring aperture 15. The inner ring 12 can be attached to the outer ring 11 by the multiple spokes 13. The support structure 10 shapes can optimize strength and percent open area.

20 Claims, 6 Drawing Sheets

WAGON WHEEL SHAPED X-RAY WINDOW SUPPORT STRUCTURE

PRIORITY CLAIM

Priority is claimed to U.S. Provisional Patent Application No. 63/463,618, filed May 3, 2023, which is hereby incorporated herein by reference.

FIELD OF THE INVENTION

The present application is related to x-ray windows.

BACKGROUND

X-ray windows are designed to transmit a high percent of x-rays, even low energy x-rays. X-ray windows are used in expensive systems requiring high reliability. High system requirements result in demanding characteristics of the x-ray window.

BRIEF DESCRIPTION OF THE DRAWINGS (DRAWINGS MIGHT NOT BE DRAWN TO SCALE)

FIGS. 1-5 are top-views of support structures 10 for an x-ray window.

Figure 5:
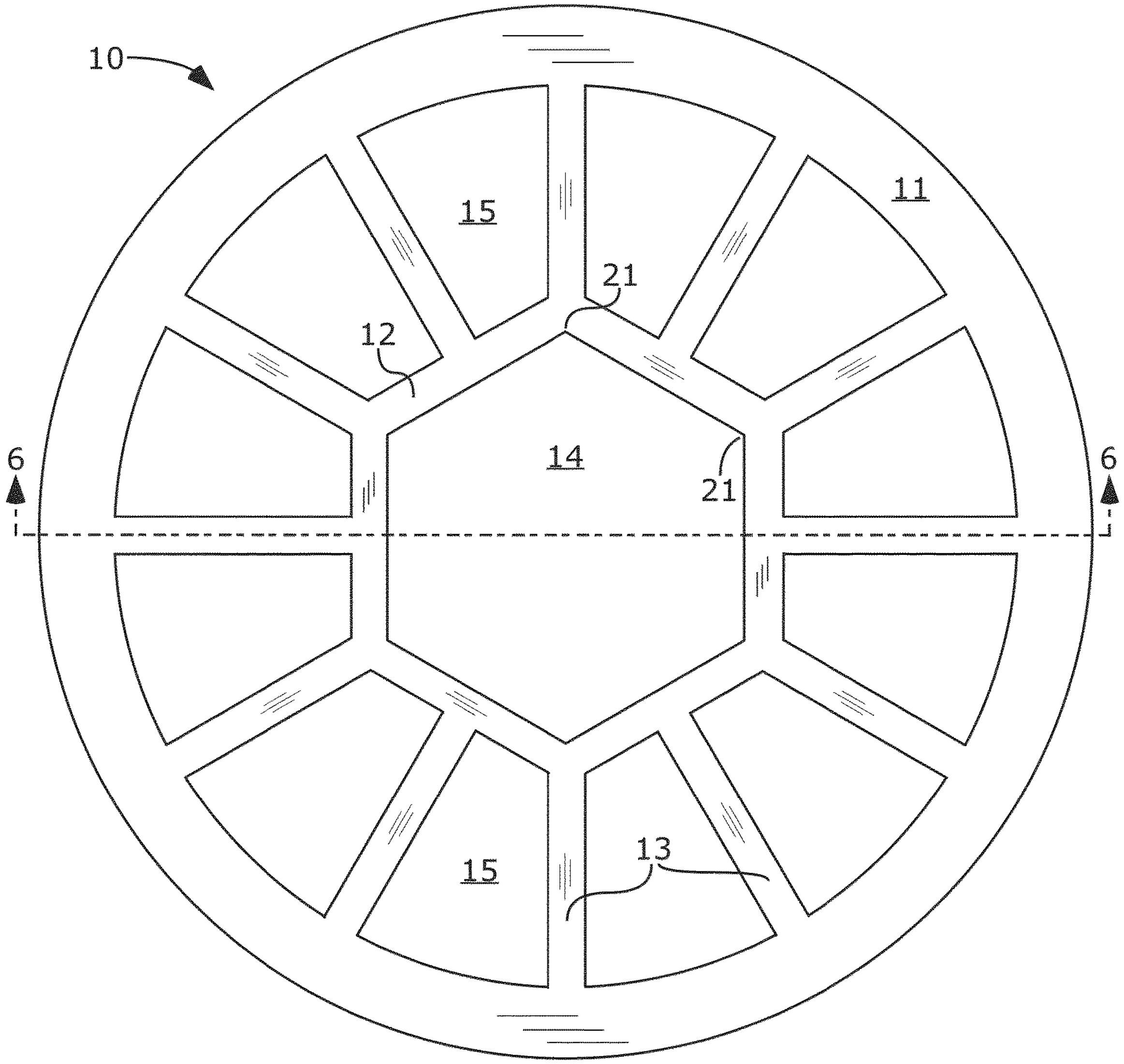
Figure 6:
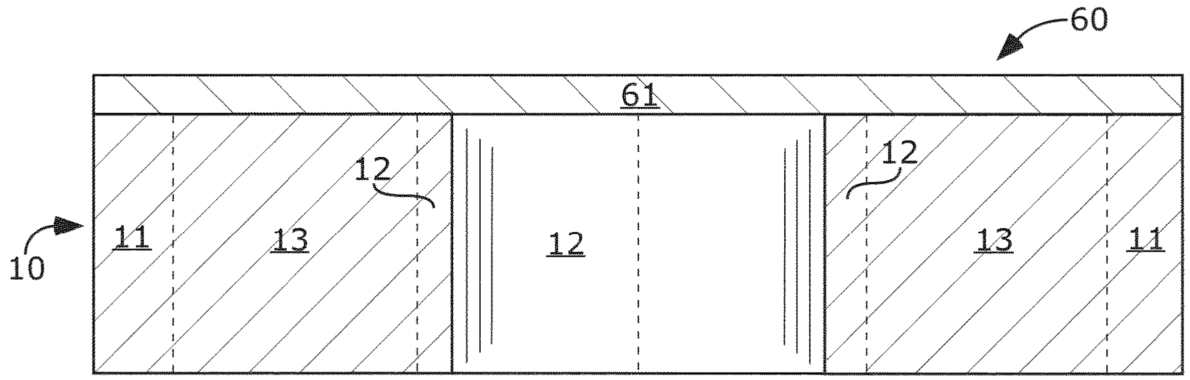

FIG. 6 is a cross-sectional side-view of an x-ray window 60 including a thin film 61 sealed to the support structure 10 of FIG. 5, taken along line 6-6 in FIG. 5.

Figure 7:
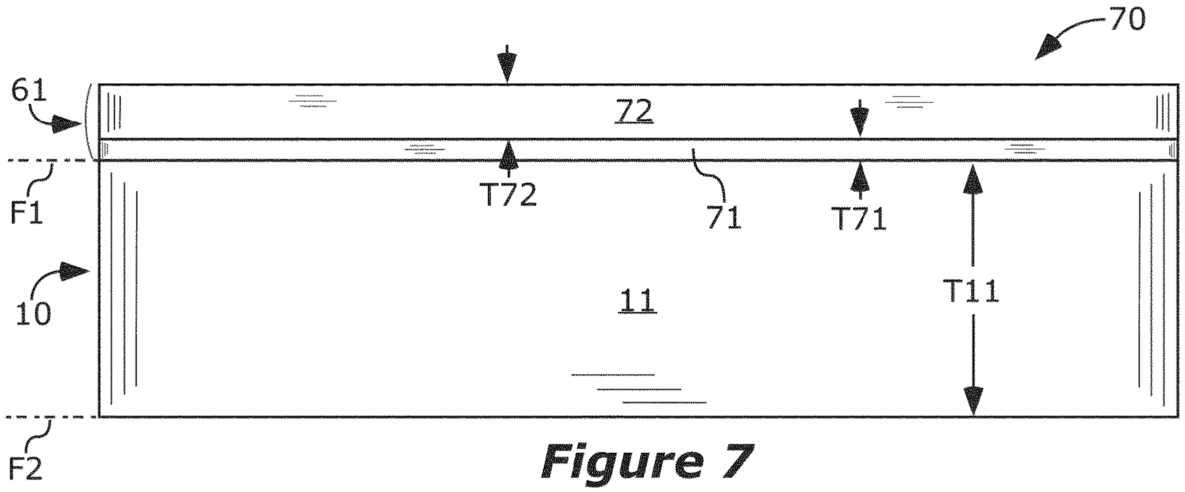

FIG. 7 is a side-view of an x-ray window 60 including a thin film 61 sealed to a support structure 10.

REFERENCE NUMBERS IN THE DRAWINGS support structure 10
outer ring 11
inner ring 12
spokes 13
spokes 13*a* (subset of the spokes 13) are aligned with side 12*a* of the hexagonal shape
spokes 13*b* (subset of the spokes 13) are a pair of spokes 13*b* attached to each corner 21
spokes 13*c* (subset of the spokes 13) merge at the outer ring 11.
spokes 13*d* (subset of the spokes 13) are a pair of spokes 13*d* attached to each point 31
spokes 13*e* (subset of the spokes 13) merge at the outer ring 11
inner aperture 14
diameter D14 of the inner aperture 14
outer ring aperture 15
diameter D15 of the outer ring aperture 15
corner 21 of the hexagonal shape
points 31 of a six-pointed star shape
four-sided section 32 of the outer ring aperture 15
pairs P1 and P2 of the four-sided section 32
three-sided section 33 of the outer ring aperture 15
one arcuate side 33*a* of the three-sided section 33
two straight sides 33*s* of the three-sided section 33
x-ray window 60 or 70
thin film 61
polymer layer 71
thickness T71 of the polymer layer 71
boron layer 72 thickness T72 of the boron layer 72
planar faces F1 and F2

Definitions

The following definitions, including plurals of the same, apply throughout this patent application.

As used herein, the terms “on”, “located on”, “located at”, and “located over” mean located directly on or located over with some other solid material between. The terms “located directly on”, “adjoin”, “adjoins”, and “adjoining” mean direct and immediate contact.

As used herein, the term “equal” (e.g. equal widths) means exactly equal; equal within normal manufacturing tolerances; or almost exactly equal, such that any deviation from exactly equal would have negligible effect for ordinary use of the device.

DETAILED DESCRIPTION

Useful characteristics of x-ray windows include low gas permeability, low outgassing, high strength, low visible and infrared light transmission, high x-ray flux, made of low atomic number materials, corrosion resistance, high reliability, high open area, and low-cost. Each x-ray window design is a balance between these characteristics.

An x-ray window can combine with a housing to enclose an internal vacuum. The internal vacuum can aid device performance. For example, an internal vacuum for an x-ray detector (a) minimizes gas attenuation of incoming x-rays and (b) allows easier cooling of the x-ray detector.

Permeation of a gas through the x-ray window can degrade the internal vacuum. Thus, low gas permeability is a desirable x-ray window characteristic.

Outgassing from x-ray window materials can degrade the internal vacuum of the device. Thus, selection of materials with low outgassing is useful.

The x-ray window can face vacuum on one side and atmospheric pressure on an opposite side. Therefore, the x-ray window may need strength to withstand this differential pressure.

Visible and infrared light can cause undesirable noise in the x-ray detector. The ability to block transmission of visible and infrared light is another useful characteristic of x-ray windows.

A high x-ray flux through the x-ray window allows rapid functioning of the x-ray detector. Therefore, high x-ray transmissivity through the x-ray window is useful.

Detection and analysis of low-energy x-rays are needed in some applications. High transmission of low-energy x-rays is thus another useful characteristic of x-ray windows.

X-rays can be used to analyze a sample. X-ray noise from surrounding devices, including from the x-ray window, can interfere with a signal from the sample. X-ray noise from high atomic number materials are more problematic. It is helpful, therefore, for the x-ray window to be made of low atomic number materials.

X-ray windows are used in corrosive environments, and may be exposed to corrosive chemicals during manufacturing. Thus, corrosion resistance is another useful characteristic of an x-ray window.

X-ray window failure is intolerable in many applications. For example, x-ray windows are used in analysis equipment on Mars. High reliability is a useful x-ray window characteristic.

An x-ray window can include a thin film sealed to a support structure. The support structure can include ribs or other support structures to support the thin film. Because the ribs/support structures can attenuate x-rays, it is helpful to minimize them, and to increase the percent open area.

X-ray window customers demand low-cost x-ray windows with the above characteristics. Reducing x-ray window cost is another consideration.

The x-ray windows described herein, and x-ray windows manufactured by the methods described herein, can have these useful characteristics (low gas permeability, low outgassing, high strength, low visible and infrared light transmission, high x-ray flux, low atomic number materials, corrosion resistance, high reliability, and low-cost). Each example may satisfy one, some, or all of these useful characteristics.

FIGS. 1-5 are top-views of support structures 10 for an x-ray window. The support structures 10 can include an outer ring 11, an inner ring 12, multiple spokes 13, an outer ring aperture 15, and an inner aperture 14.

Figure 1:
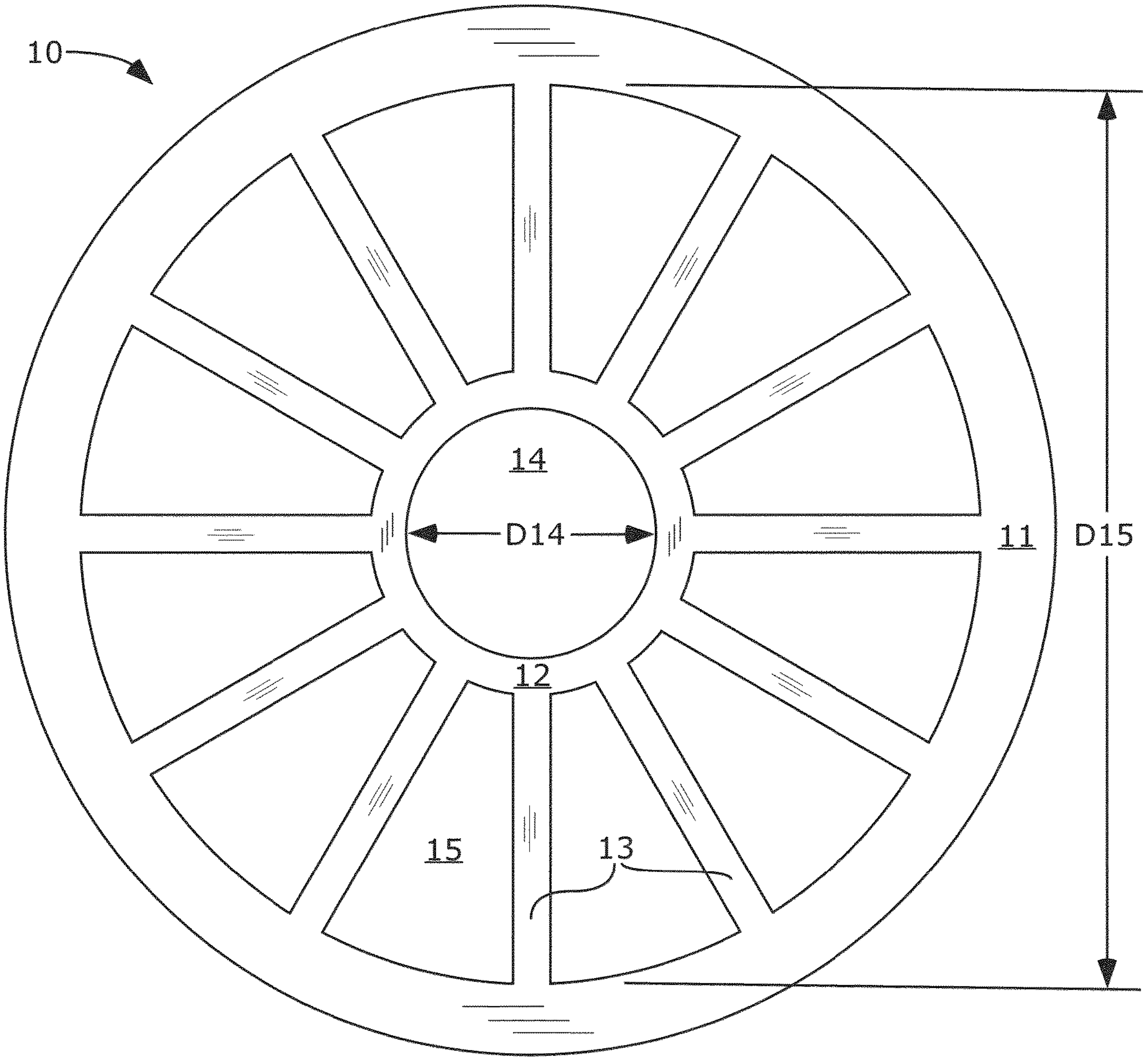

In FIG. 1, the inner ring 12 and/or the inner aperture 14 can have a circular shape.

Figure 2:
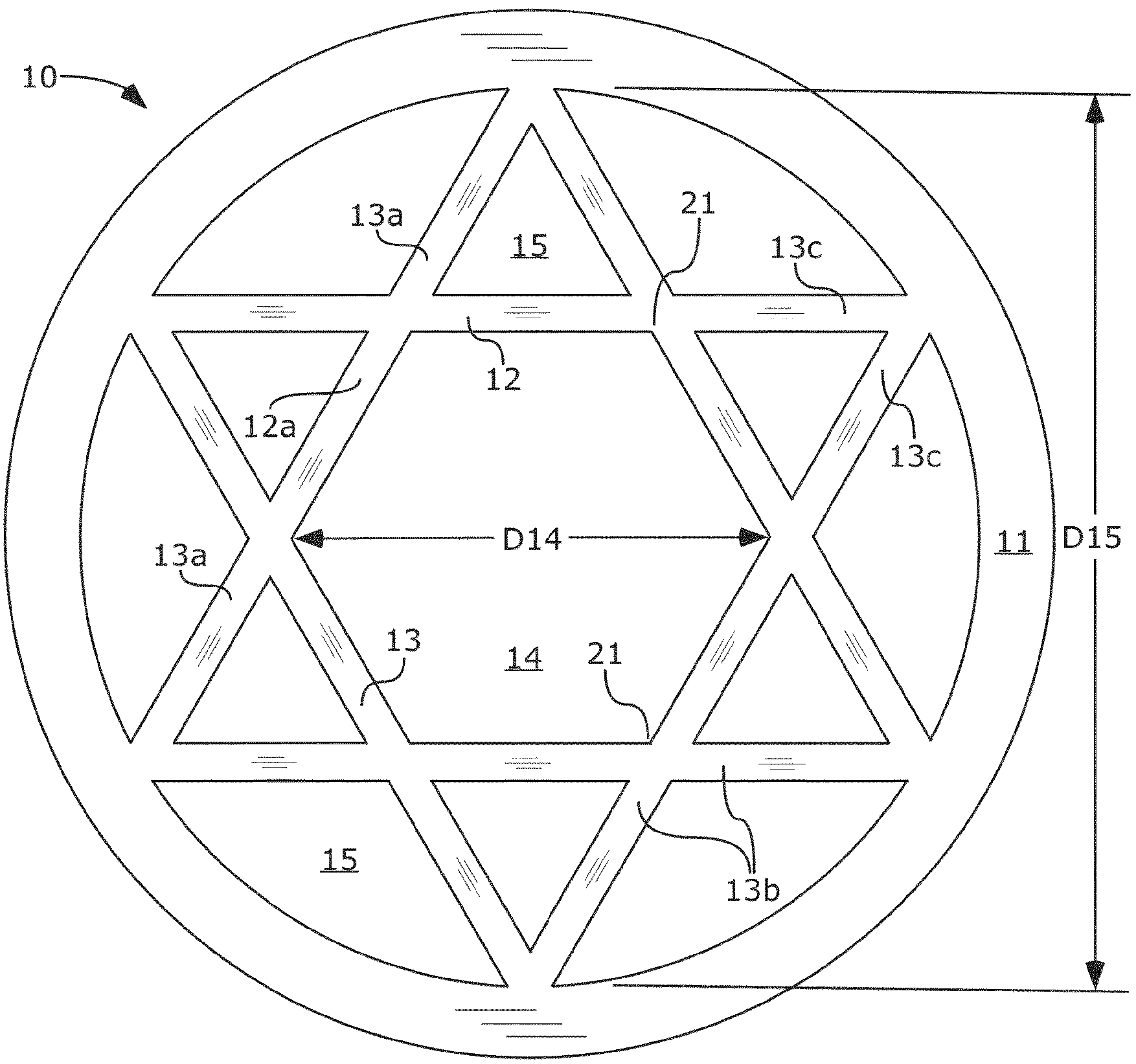

In FIG. 2, the inner ring 12 and/or the inner aperture 14 can have a hexagonal shape. A pair of spokes 13*b* can be attached to each corner 21 of the hexagonal shape. Two spokes 13*a* can be aligned with each side 12*a* of the hexagonal shape.

Figure 3:
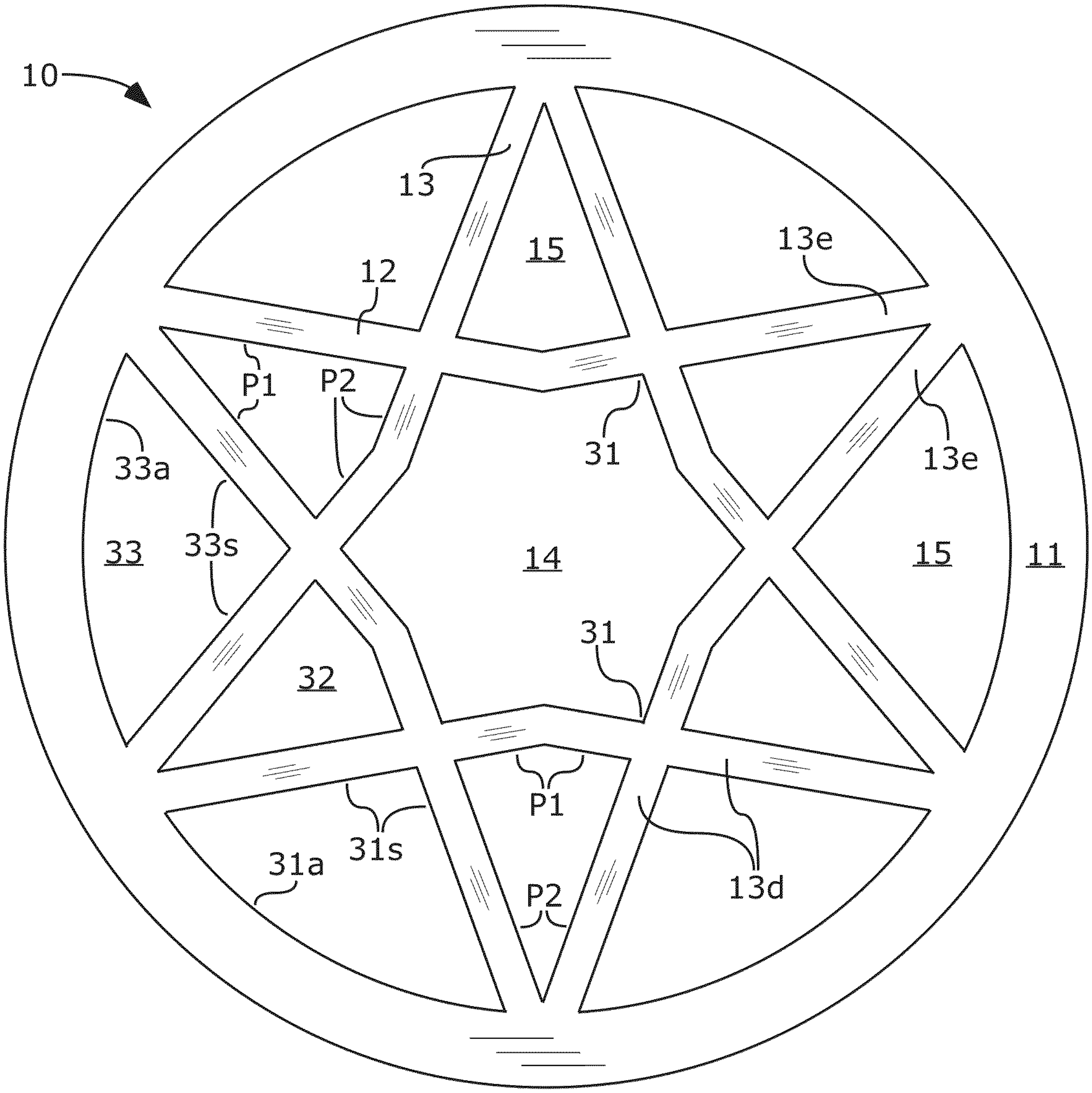

In FIG. 3, the inner ring 12 and/or the inner aperture 14 can have a six-pointed star shape (see points 31).

Figure 4:
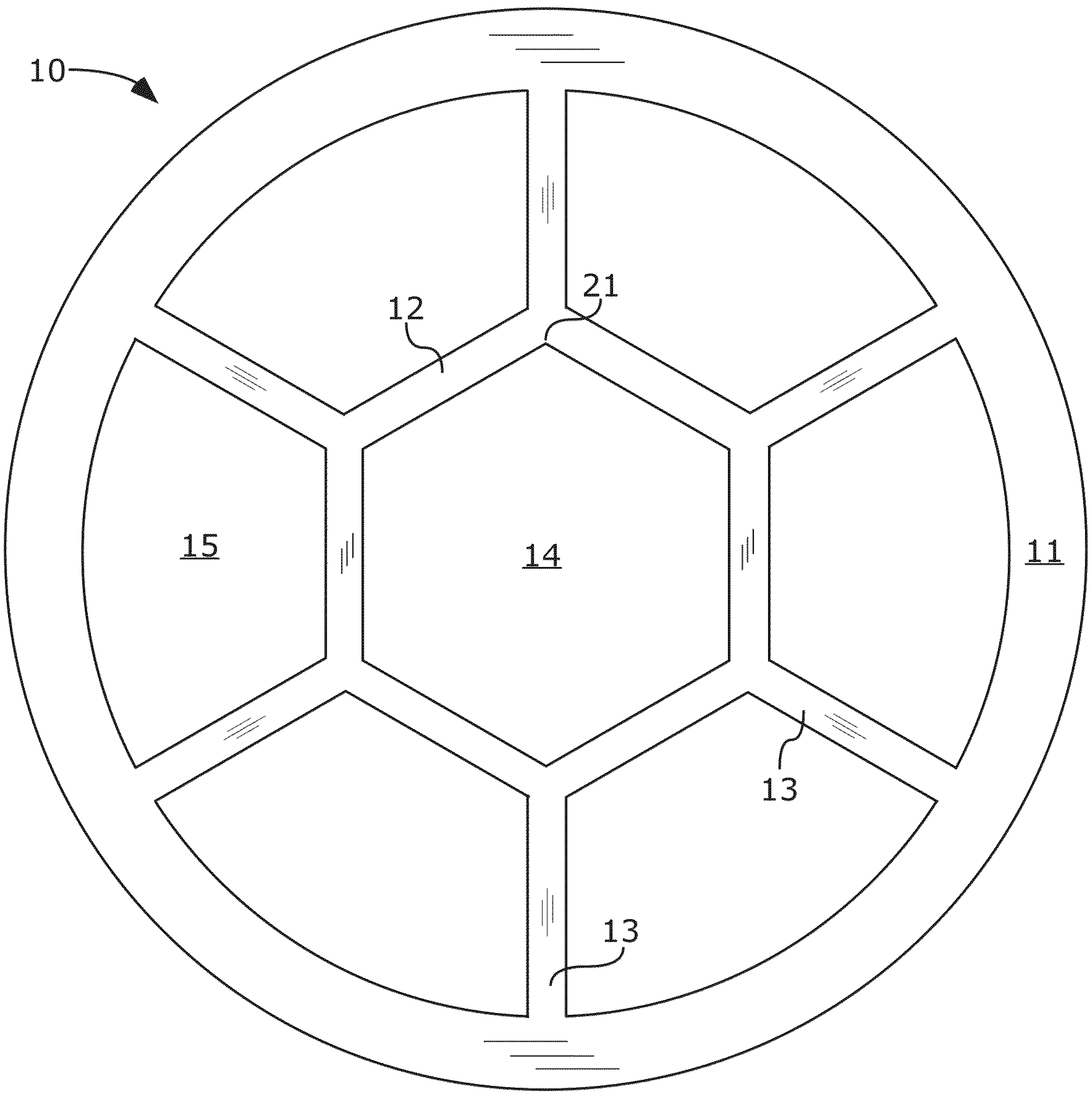

In FIG. 4, the inner ring 12 and/or the inner aperture 14 can have a hexagonal shape. There can be six spokes 13. A single spoke 13 can be attached to each corner 21 of the hexagonal shape.

In FIG. 5, the inner ring 12 and/or the inner aperture 14 can have a hexagonal shape. There can be twelve spokes. A single spoke 13 can be attached to each corner 21 of the hexagonal shape. There can also be a single spoke 13 between each pair of adjacent corners 21 of the hexagonal shape.

FIG. 6 is a cross-sectional side-view of an x-ray window 60 including a thin film 61 sealed to the support structure 10 of FIG. 5, taken along line 6-6 in FIG. 5.

FIG. 7 is a side-view of an x-ray window 60 including a thin film 61 sealed to a support structure 10. The thin film 61 can include a polymer layer 71 and a boron layer 72.

The x-ray window 60 or 70 can include a thin film 61 (FIGS. 6-7) sealed to a support structure 10 (FIGS. 1-7). The support structure 10 can include an outer ring 11 encircling an outer ring aperture 15, an inner ring 12 encircling an inner aperture 14, and multiple spokes 13. The inner ring 12 can be located in the outer ring aperture 15. The thin film 61 can span the inner aperture 14 and the outer ring aperture 15.

The inner ring 12 can be attached to the outer ring 11 by the multiple spokes 13. The multiple spokes 13 can be spaced evenly around a perimeter of the inner ring 12. The multiple spokes 13 can have equal widths with respect to each other.

As illustrated in FIGS. 1-5, the outer ring 11 can have a circular shape. The outer ring 11 can have other shapes, including rectangular, oval, or hexagonal.

More and/or wider support (inner ring 12 and spokes 13) within the outer ring aperture 15 can increase strength of the support structure. This increased strength can allow the support structure 10 to span a larger distance and/or withstand a larger pressure differential across the x-ray window without breaking.

More and/or wider support within the outer ring aperture 15, however, decreases the percent open area. It is useful to shape the support structure 10 for optimal strength without undue adverse impact on the percent open area.

Thus, the inner ring 12 and/or the inner aperture 14 can be shaped for optimal balance of strength and percent open area. These shapes of the support structures 10 in all of the figures are useful, but some may be better than others. The figure of the support structures 10 ranked from most to least preferred are FIG. 5, FIG. 1, FIG. 4, FIG. 3, then FIG. 2. This ranking is based on overall high strength and large open area combined.

The open area is the area outside of the support structures (i.e. outside of the inner ring 12, the spokes 13, or any other solid material), and within the outer ring aperture 15. The percent open area is the open area divided by the total area within the outer ring aperture 15. For example, the percent open area can be ≥70%, ≥75%, ≥80%, ≥85%, or ≥90%. The percent open area can be ≤90% or ≤95%. The percent open area in FIG. 1 is about 75%.

A ratio of a diameter D15 of the outer ring aperture 15 to the diameter D14 of the inner aperture 14 can be selected for better balance of strength and large open area. For example, 1.5≤D15/D14, 2≤D15/D14, 2.5≤D15/D14, or 3≤D15/D14. Other examples include D15/D14≤4, D15/D14≤4.5, D15/D14≤5, or D15/D14≤6. If there are multiple diameters (e.g. for the hexagonal-shaped inner aperture 14), then the diameter D15 and/or D14 for the ratio is the largest diameter. In FIG. 1, D15/D14=3.6. In FIG. 2, D15/D14=1.9. In FIG. 5, D15/D14=2.2.

As illustrated in FIG. 1, the inner ring 12 and/or the inner aperture 14 can have a circular shape. The outer ring 11 and the inner ring 12 can be concentric with respect to each other.

As illustrated in FIGS. 2, 4, and 5, the inner ring 12 and/or the inner aperture 14 can have a hexagonal shape. As illustrated in FIG. 3, the inner ring 12 and/or the inner aperture 14 can have a six-pointed star shape (see points 31).

As illustrated in FIG. 2, two spokes 13*a* can be aligned with each side 12*a* of the hexagonal shape. Two spokes 13*b* can be attached to each corner 21 of the hexagonal shape. One of two spokes 13*c* for each corner 21 can merge with one of two spokes 13*c* at an adjacent corner 21 at an end of the spokes 13*c* closest to the outer ring 11.

As illustrated in FIG. 3, two spokes 13*d* can be attached to each point 31 of the six-pointed star shape. One of two spokes 13*e* for each point 31 can merge with one of two spokes 13*e* at an adjacent point 31 at an end of the spokes 13*e* closest to the outer ring 11.

As illustrated in FIG. 3, the outer ring aperture 15, between the outer ring 11 and the inner ring 12, can be separated into different sections 32 and 33. Shapes of these sections 32 and 33 can include a four-sided section 32 alternating with a three-sided section 33. These shapes can be associated with the six-pointed star shape (see points 31) of the inner ring 12 and/or the inner aperture 14.

The four-sided section 32 can include two pairs P1 and P2. The length of both sides of each pair P1 or P2 can be equal with respect to each other. The sides of one of the pairs P1 can have a different length than the sides of the other pair P2 (e.g. length of P1>length of P2). In the four-sided section 32, there can be no parallel pairs of sides. The three-sided section 33 can have two straight sides 33*s* and one arcuate side 33*a*.

As illustrated in FIGS. 1-3 and 5, there can be twelve spokes 13 (no more and no less than twelve spokes 13). As illustrated in FIG. 4, there can be six spokes 13 (no more and no less than six spokes 13). There can be more than twelve spokes 13, less than six spokes 13, or at least six spokes 13 and no more than twelve spokes 13. There can be ≥three spokes 13, ≥six spokes 13, or ≥nine spokes 13. There can be ≤twelve spokes 13, ≤eighteen spokes 13, or ≤twenty four spokes 13. It can be useful to have a sufficient number of spokes 13 to provide desired strength, but not too many spokes 13 in order to avoid unnecessary reduction of open area.

As illustrated in FIGS. 4 and 5, a single spoke 13 can be attached to each corner 21 of the hexagonal shape.

As illustrated in FIG. 5, the support structure 10 can have increased strength, with some reduction in open area, with a single spoke 13 located between each pair of adjacent corners 21 of the hexagonal shape. This single spoke 13 between each pair of adjacent corners 21 can be located at a midpoint between the pair of adjacent corners 21 of the hexagonal shape.

A material composition of the support structure 10 can be uniform throughout. The support structure 10 can include silicon, polycarbonate, or both. For example, a material composition of the support structure 10 can be at least 90 mass percent silicon or at least 90 mass percent polycarbonate.

As illustrated in FIGS. 6 and 7, the x-ray windows 60 and 70 can include a thin film 61 sealed to a support structure 10. The support structure 10 can be any support structure 10 described herein.

The thin film 61 can include graphite, diamond, beryllium, amorphous carbon, graphene, boron, polymer, or combinations thereof. The thin film 61 can include a boron layer 72 and a polymer layer 71. The boron layer 72 and a polymer layer 71 can adjoin each other. The polymer layer 71 can be sandwiched between the boron layer 72 and the support structure 10.

The boron layer 72 can include at least 70 mass percent boron, at least 80 mass percent boron, or at least 90 mass percent boron. The polymer layer 71 can include at least 70 mass percent polymer, at least 80 mass percent polymer, or at least 90 mass percent polymer. The polymer can be or can include polyimide. Therefore, the polymer layer 71 can include at least 70 mass percent polyimide, at least 80 mass percent polyimide, or at least 90 mass percent polyimide.

Here are example thicknesses of the layers of the x-ray window 70 in FIG. 7:

$0.5\ \mu m \leq T72 \leq 4\ \mu m$, where T72 is a thickness of the boron layer 72;

$5\ nm \leq T71 \leq 100\ nm$, where T71 is a thickness of the polymer layer 71; and/or $50\ \mu m \leq T11 \leq 1000\ \mu m$, where T11 is a thickness of the support structure 10.

The support structure 10 can include two planar faces F1 and F2 (see FIG. 7). The two planar faces F1 and F2 can be parallel to each other. One side of the outer ring 11, the inner ring 12, and the spokes 13 can align with one planar face F1. An opposite side of the outer ring 11, the inner ring 12, and the spokes 13 can align with the other planar face F2.

The shape of the support structure 10 can be formed by laser cutting, laser ablation, or etching a sheet of material. For example, a sheet of silicon or polycarbonate can be cut by a laser or chemically etched to form the shapes shown in FIGS. 1-5.

The thin film 61 can be attached to the support structure 10 by an adhesive. Alternatively, the thin film 61, such as polyimide, can be attached while still wet/not fully cured. The thin film 61 can then be cured to solidify.

What is claimed is:

1. An x-ray window comprising:

a thin film sealed to a support structure;

the support structure including an outer ring encircling an outer ring aperture, an inner ring encircling an inner aperture, and multiple spokes;

the inner ring is located in the outer ring aperture and is attached to the outer ring by the multiple spokes;

the thin film spans the inner aperture and the outer ring aperture;

the thin film includes a boron layer with at least 90 mass percent boron and a polymer layer with at least 90 mass percent polymer;

the polymer layer is sandwiched between the boron layer and the support structure; and a material composition of the support structure is at least 90 mass percent silicon or at least 90 mass percent polycarbonate.

2. The x-ray window of claim 1, wherein the outer ring has a circular shape and the inner ring has a circular shape.

3. The x-ray window of claim 1, wherein the inner ring has a hexagonal shape.

4. The x-ray window of claim 3, wherein there are six spokes, each attached to a corner of the hexagonal shape.

5. The x-ray window of claim 3, wherein there are twelve spokes, and a pair of spokes is attached to each corner of the hexagonal shape.

6. The x-ray window of claim 3, wherein a single spoke of the multiple spokes is attached to each corner of the hexagonal shape, and a single spoke of the multiple spokes is located between each pair of adjacent corners of the hexagonal shape.

7. The x-ray window of claim 3, wherein two spokes are attached to each corner of the hexagonal shape.

8. The x-ray window of claim 7, wherein one of the two spokes for each corner merges with one of the two spokes at an adjacent corner at an end of the spokes closest to the outer ring.

9. The x-ray window of claim 1, wherein the inner ring has a six-pointed star shape.

10. The x-ray window of claim 9, wherein the outer ring aperture, between the outer ring and the inner ring, is separated into different sections, and shapes of these sections include a three-sided section alternating with a four-sided section.

11. The x-ray window of claim 10, wherein the three-sided section has two straight sides and one arcuate side.

12. The x-ray window of claim 10, wherein the four-sided sections include two pairs, a length of both sides of each pair are equal with respect to each other, and the sides of one of the pairs has a different length than the sides of the other of the pairs.

13. The x-ray window of claim 10, wherein the four-sided sections include no parallel pairs of sides.

14. The x-ray window of claim 1, wherein there are at least six and no more than twelve spokes.

15. The x-ray window of claim 1, wherein:

$0.5\ \mu m \leq T72 \leq 4\ \mu m$, where T72 is a thickness of the boron layer;

$5\ nm \leq T71 \leq 100\ nm$, where T71 is a thickness of the polymer layer; and $50\ \mu m \leq T11 \leq 1000\ \mu m$, where T11 is a thickness of the support structure.

16. The x-ray window of claim 1, wherein the support structure includes two planar faces, which are parallel to each other, and one side of the outer ring, the inner ring, and the spokes aligns with one of the two planar faces and an opposite side of the outer ring, the inner ring, and the spokes aligns with the other of the two planar faces.

17. The x-ray window of claim 1, wherein a percent open area within the outer ring aperture is at least 75%, where the percent open area is an area within the outer ring aperture without the inner ring, spokes, or any other solid material divided by a total area within the outer ring aperture.

18. The x-ray window of claim 17, wherein a percent open area within the outer ring aperture is at least 80%.

19. The x-ray window of claim 1, wherein $1.5 \leq D15/D14 \leq 4.5$, where D15 is a diameter of the outer ring aperture and D14 is a diameter of the inner aperture.

20. The x-ray window of claim 1, wherein the polymer is polyimide.

* * * * *